(12) United States Patent
Sayama (10) Patent No.: US 9,041,984 B2
(45) Date of Patent: May 26, 2015

(54) IMAGE READING DEVICE AND IMAGE FORMING APPARATUS

(71) Applicant: Kyocera Document Solutions Inc., Osaka (JP)

(72) Inventor: Haruki Sayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/170,270

(22) Filed: Jan. 31, 2014

(65) Prior Publication Data

US 2014/0211272 A1  Jul. 31, 2014

(30) Foreign Application Priority Data

Jan. 31, 2013  (JP) .................................. 2013-016976

(51) Int. Cl.
*H04N 1/04* (2006.01)
*H04N 1/00* (2006.01)
*H04N 1/028* (2006.01)

(52) U.S. Cl.
CPC ....... *H04N 1/00997* (2013.01); *H04N 1/00278* (2013.01); *H04N 1/02815* (2013.01)

(58) Field of Classification Search
CPC ..... H04N 9/735; H04N 1/1013; H04N 1/193; H04N 1/1531; H04N 3/1575; H04N 9/045; H04N 1/00405; H04N 1/0049; H04N 1/00689; H04N 1/00692; H04N 1/0071; H04N 1/00713
USPC ........... 358/475, 1.9, 1.12, 1.4, 1.6, 474, 483, 358/506, 509; 382/275
See application file for complete search history.

(56) References Cited

U.S. PATENT DOCUMENTS

| | | | |
|---|---|---|---|
| 6,388,774 B1 * | 5/2002 | Kurata et al. | 358/474 |
| 6,710,899 B2 * | 3/2004 | Chung et al. | 358/475 |
| 6,724,461 B1 | 4/2004 | Yamazaki | |
| 6,889,903 B1 * | 5/2005 | Koenck | 235/462.01 |

(Continued)

FOREIGN PATENT DOCUMENTS

| | | | |
|---|---|---|---|
| JP | H07-245682 A | | 9/1995 |
| JP | H08-317192 A | | 11/1996 |
| JP | H11-346313 A | | 12/1999 |
| JP | 2005-117657 A | | 4/2005 |
| JP | 2005-195785 A | | 7/2005 |
| JP | 2006-020129 A | | 1/2006 |
| JP | 2012-034168 A | | 2/2012 |

OTHER PUBLICATIONS

An Office Action; "Notice of Reasons for Rejection," issued by the Japanese Patent Office on Apr. 21, 2015, which corresponds to Japanese Patent Application No. 2013-016976 and is related to U.S. Appl. No. 14/170,270.

*Primary Examiner* — Negussie Worku
(74) *Attorney, Agent, or Firm* — Studebaker & Brackett PC (57) ABSTRACT

An image reading device includes a light source, an imaging section, and a controller. The light source includes a plurality of light emitting elements. The light source irradiates light to an original document, while moving relative to the original document. The imaging section obtains scan data read from the original document by light irradiated to the original document from the light source. The controller controls the light source and the imaging section. The controller determines a read target region and a non-read target region in the original document, turns on a light emitting element out of the plurality of light emitting elements, which corresponds to the read target region, and turns off a light emitting element out of the plurality of light emitting elements, which corresponds to the non-read target region.

12 Claims, 9 Drawing Sheets

(56) References Cited

U.S. PATENT DOCUMENTS

| | | | |
|---|---|---|---|
| 7,733,538 B2* | 6/2010 | Kanesaka et al. | 358/474 |
| 7,804,627 B2* | 9/2010 | Horiguchi | 358/488 |
| 8,488,219 B2* | 7/2013 | Mikami | 358/475 |
| 8,553,298 B2* | 10/2013 | Kubozono et al. | 358/483 |
| 8,913,306 B2* | 12/2014 | Katsuda | 358/475 |
| 8,928,961 B2* | 1/2015 | Tanaka | 358/518 |
| 2005/0072903 A1 | 4/2005 | Voss et al. | |
| 2006/0001923 A1 | 1/2006 | Katutani | |

* cited by examiner

FIG. 9

IMAGE READING DEVICE AND IMAGE FORMING APPARATUS

INCORPORATION BY REFERENCE

The present application claims priority under 35 U.S.C. §119 to Japanese Patent Application No. 2013-16976, filed Jan. 31, 2013. The contents of this application are incorporated herein by reference in their entirety.

BACKGROUND

The present disclosure relates to image reading devices and image forming apparatuses.

Image reading devices for reading an image of an original document read image data of an original document in a manner that a light source irradiates light to the original document, and an imaging section receives the light reflected by the original document. Some image reading device performs lighting control on the light source according to the size of original documents. Some image reading device irradiates light only to an original document without irradiating light to a site other than the original document, thereby saving power consumption.

SUMMARY

An image reading device according to the present disclosure includes a light source, an imaging section, and a controller. The light source includes a plurality of light emitting elements. The light source irradiates light to an original document, while moving relative to the original document. The imaging section obtains scan data read from the original document by irradiating the light to the original document from the light source. The controller controls the light source and the imaging section. The controller determines a read target region and a non-read target region in the original document, turns on a light emitting element out of the plurality of light emitting elements, which corresponds to the read target region, and turns off a light emitting element of the plurality of light emitting elements, which corresponds to the non-read target region.

An image forming apparatus according to the present disclosure includes the above image reading device and a printing section. The printing section performs printing on the basis of the scan data obtained by the image reading section.

DETAILED DESCRIPTION

An image reading device and an image forming apparatus according to embodiments of the present disclosure will be described below with reference to the accompanying drawings. It should be noted that the present disclosure is not limited to the following embodiments.

Figure 1A:
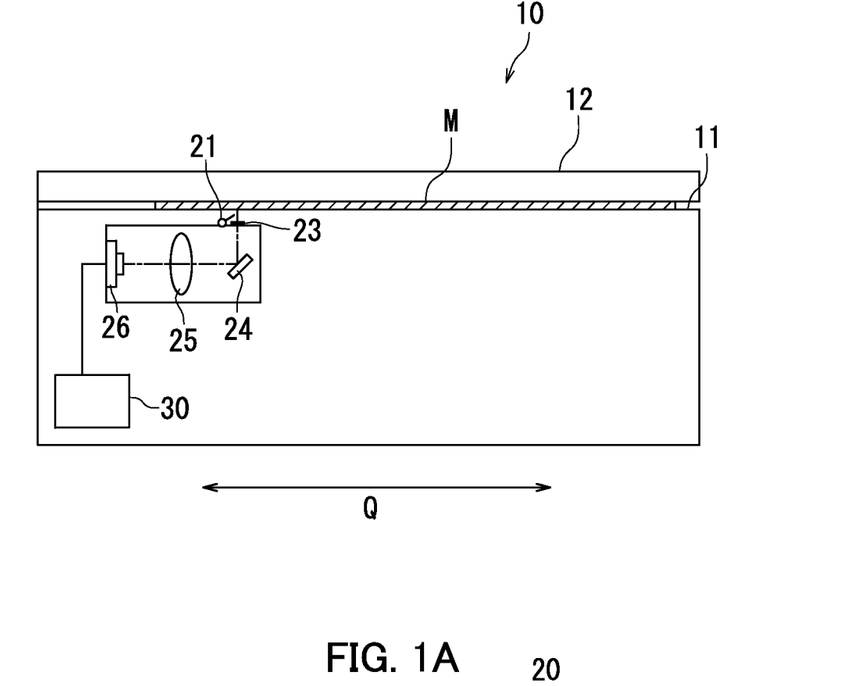
FIG. 1A is a schematic side view showing an image reading device according to one embodiment of the present disclosure.
Figure 1B:
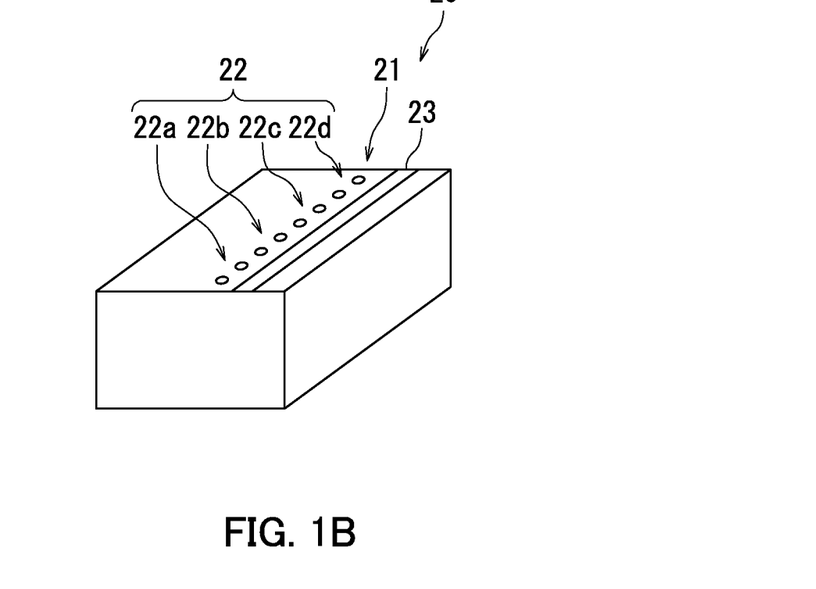
FIG. 1B is a schematic perspective view showing a movable unit of the image reading device according to one embodiment of the present disclosure.

An image reading device 10 according to one embodiment of the present disclosure will now be described with reference to FIG. 1. FIG. 1A is a schematic side view showing the image reading device 10 according to the present embodiment of the present disclosure. FIG. 1B is a schematic perspective view showing a movable unit 20 of the image reading device 10 according to the present embodiment of the present disclosure.

The image reading device 10 includes a light source 21, an imaging section 26, and a controller 30. Typically, the image reading device 10 further includes a document table 11 and a document cover 12. The image reading device 10 reads an original document M loaded on the document table 11 to obtain scan data (read data or image data of original document). The image reading device 10 may be a scanner, for example. The original document M may be paper, for example, but is not limited to paper. For example, the original document M may be cloth or a thick three-dimensional object.

The image reading device 10 includes a movable unit (carriage) 20. The movable unit 20 moves under the document table 11. The document table 11 is transparent, for example. The document table 11 is made of glass, for example. A light source 21, a reflecting mirror 24, a lens 25, and an imaging section 26 are mounted in the movable unit 20. A slit 23 is formed in the top surface of the movable unit 20. The movable unit 20 moves relative to the original document M in a movement direction Q together with the light source 21, the reflecting mirror 24, the lens 25, and the imaging section 26.

The light source 21 includes a plurality of light emitting elements 22. The light emitting elements 22 are arranged in the direction orthogonal to the movement direction Q. In the present description, two adjacent light emitting elements 22 located at one of end parts of the array of the plurality of light emitting elements 22 may be referred to as light emitting elements 22a. Next adjacent two light emitting elements 22 may be referred to as light emitting elements 22b. Further next adjacent two light emitting elements 22 may be referred to as light emitting elements 22c. Still further next adjacent two light emitting elements 22 may be referred to as light emitting elements 22d. The light emitting elements 22 may be light emitting diodes (LEDs), for example. The light source 21 irradiates light to the original document M, while moving relative to the original document M.

The course of the light emitted from the light source 21 to the imaging section 26 will now be described below. The light source 21 irradiates the document table 11 from below. The light emitted from the light source 21 is reflected by the original document M, passes through the slit 23, and reaches the reflecting mirror 24. The light reaching the reflecting mirror 24 is reflected by the reflecting mirror 24, passes through the lens 25, and then reaches the imaging section 26.

The imaging section 26 may be a charge coupled device (CCD), for example. From the light reaching the imaging section 26, the imaging section 26 obtains scan data for each line of the original document M in the form of an analog signal. Thereafter, the scan data is converted from the analog signal to a digital signal in an analog front end (AFE) 44 (not shown in FIG. 1). The scan data converted to the digital signal is input to the controller 30.

The controller 30 controls the light source 21 and the imaging section 26. The controller 30 includes an application specific integrated circuit (ASIC) 31, a central processing unit (CPU) 32, a read only memory (ROM) 33, and a random access memory (RAM) 34, for example. Control on the light source 21 by the controller 30 can result in individual turning on/off of the plurality of light emitting elements 22 that the light source 21 includes. Herein, the lights of the light emitting elements 22 are turned on/off in units of two light emitting elements of the light emitting elements 22a, the light emitting elements 22b, the light emitting elements 22c, and the light emitting elements 22d.

Figure 2:
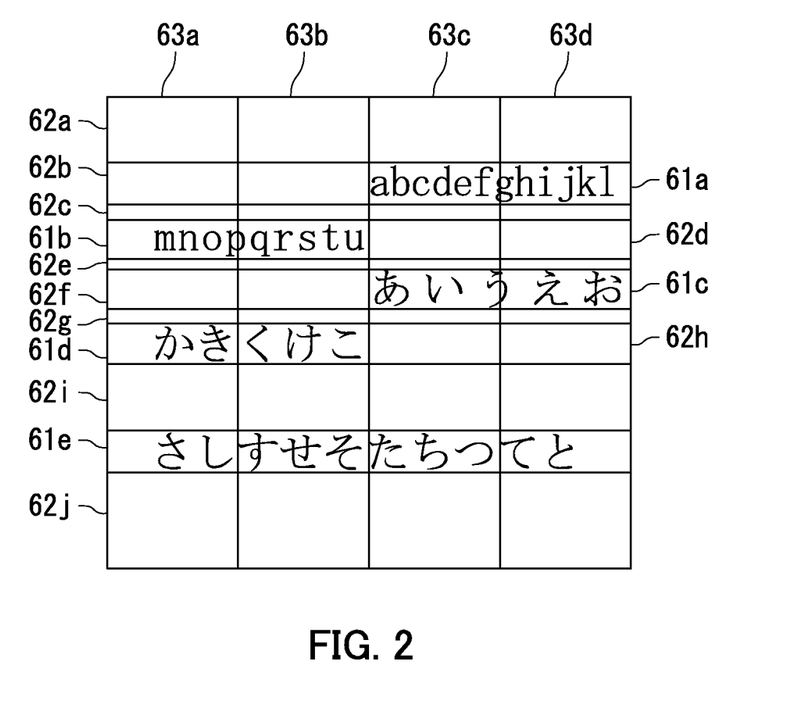
FIG. 2 is a schematic illustration showing an original document.

The controller 30 distinguishes a read target region and a non-read target region in the original document M. With reference to FIG. 2, the read target region and the non-read target region will be described below.

FIG. 2 is a schematic illustration showing the original document M. The original document M includes figures "abcdefghijkl" in alphabetic characters, figures "mnopqrstu" in alphabetic characters, figures "A, I, U, E, O" in Japanese hiragana characters, figures "Ka, Ki, Ku, Ke, Ko" in Japanese hiragana characters, figures "Sa, Shi, Su, Se, So, Ta, Chi, Tsu, Te, To" in Japanese hiragana characters, and a background without figures.

The original document M in FIG. 2 is divided into four regions (region 63a, region 63b, region 63c, and region 63d) by vertical lines. The movement direction Q shown in FIG. 1A corresponds to the vertical direction in FIG. 2. Regions where the light emitting elements 22a, the light emitting elements 22b, the light emitting elements 22c, and light emitting elements 22d shown in FIG. 1B emit light correspond to the regions 63a, 63b, 63c, and 63d, respectively, in the original document M in FIG. 2.

The controller 30 distinguishes part where figures are present and part of the background. The part where the figures are present and the part of the background are distinguished by, for example, detecting difference in light intensity of the light reflected by the original document M after emission from the light source 21.

Figure 8:
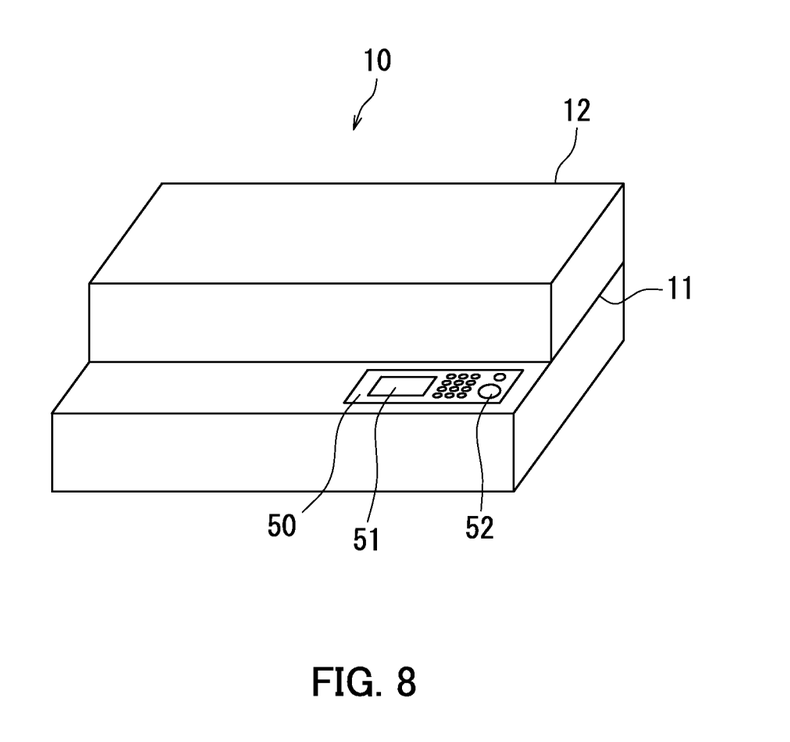
FIG. 8 is a schematic perspective view showing the image reading device 10 according to one embodiment of the present disclosure.

The controller 30 determines the read target region and the non-read target region in a manner to specify a region by pre-scan, which will be described later with reference to FIGS. 3-5, or user's manipulation, which will be described later with reference to FIG. 8. The controller 30 determines the regions 61a, 61b, 61c, 61d, and 61e where figures are present as read target regions. By contrast, the controller 30 determines the regions 62a, 62b, 62c, 62d, 62e, 62f, 62g, 62h, 62i, and 62j, which are the background where no figure is present, as non-read target regions.

The controller 30 controls the light source 21 and the imaging section 26. The controller 30 determines the read target regions and the non-read target regions in the original document M. The controller 30 then turns on light emitting elements 22 corresponding to the read target regions out of the plurality of light emitting elements 22. By contrast, the controller 30 turns off light emitting elements 22 corresponding to the non-read target regions out of the plurality of light emitting elements 22. In this manner, light emitting elements 22 corresponding to parts where reading is unnecessary are turned off so as not to consume unnecessary electric power, thereby achieving effective reduction in power consumption. In particular, reduction in power consumption can be effective in copying an original document with less printing part.

Further, the controller 30 may obtain pre-scan data before the imaging section 26 obtains the scan data to distinguish the read target regions and the non-read target regions on the basis of the pre-scan data. In this case, the image reading device 10 first performs pre-scan to read an original document M by moving the movable unit 20 in one direction. Upon completion of the pre-scan, the image reading device 10 causes the movable unit 20 to move in the direction reverse to that in the pre-scan to obtain the scan data.

Light emission control on the light source 21 of the image reading device 10 according to the present disclosure will be described below with reference to FIGS. 3-5. FIGS. 3A, 3C, 3E, and 3G are schematic perspective views showing the image reading device 10 according to the present embodiment of the present disclosure. FIGS. 3B, 3D, 3F, and 3H are schematic illustrations corresponding to FIGS. 3A, 3C, 3E, and 3G, respectively, and each showing the position of the movable unit 20 relative to the original document M.

Figure 3A:
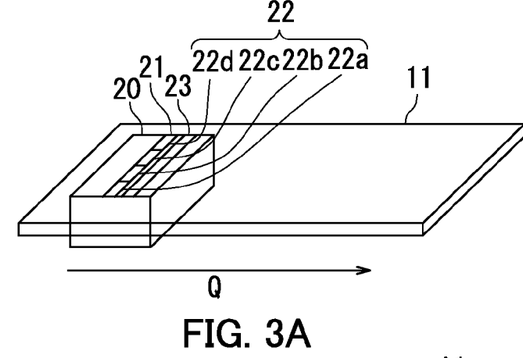
FIGS. 3A, 3C, 3E, and 3G are schematic perspective views showing the image reading device according to one embodiment of the present disclosure.

First, the movable unit 20 moves in the movement direction Q in FIG. 3A In FIG. 3A, the movement direction Q is a direction from left to right. In so doing, the controller 30 causes the light source 21 to irradiate light to the original document M at a light quantity lower than that in obtaining the scan data. In one example, the controller 30 causes the light source 21 to irradiate light to the original document M at a light quantity of 50% or lower than that in obtaining the scan data. Further, the controller 30 causes the imaging section 26 to obtain the pre-scan data read from the original document M by irradiating the light emitted from the light source 21. The pre-scan data thus read is converted from its analog signal to a digital signal in the AFE 44 and is then stored in the RAM. The controller 30 distinguishes the read target regions and the non-read target regions shown in FIG. 2 on the basis of the pre-scan data.

Figure 3B:
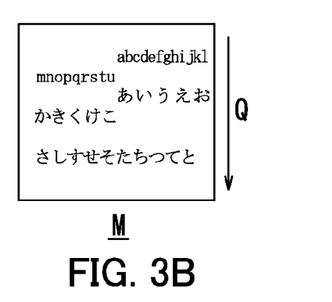
FIGS. 3B, 3D, 3F, and 3H are schematic illustrations corresponding to FIGS. 3A, 3C, 3E, and 3G, respectively, and each showing the position of the movable unit relative to the original document.

Referring to FIG. 3B, light at a light quantity lower than that in obtaining the scan data is irradiated to the original document M from the light emitting elements 22a, the light emitting elements 22b, the light emitting elements 22c, and the light emitting elements 22d. In FIG. 3B, the movement direction Q is a direction from above to below.

Figure 3C:
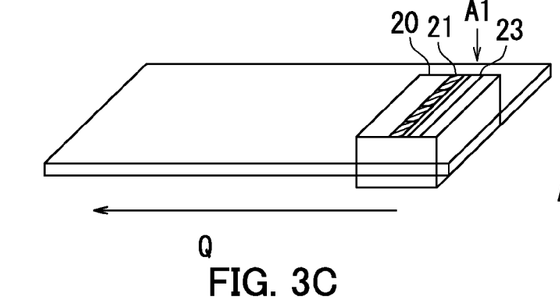
Figure 3D:
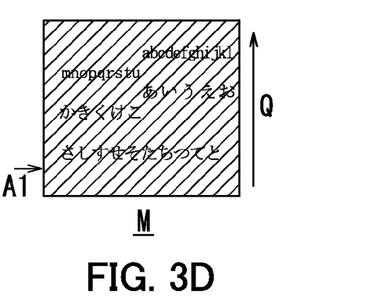

Next, the movable unit 20 moves in the movement direction Q up to a point A1, as shown in FIGS. 3C and 3D. In FIG. 3C, the movement direction Q is a direction from right to left. The region in which the point A1 is present is a non-read target region where no figure is present. Accordingly, the controller 30 turns off all of the light emitting elements 22a, the light emitting elements 22b, the light emitting elements 22c, and the light emitting elements 22d. In FIG. 3D, the movement direction Q is a direction from below to above.

Figure 3E:
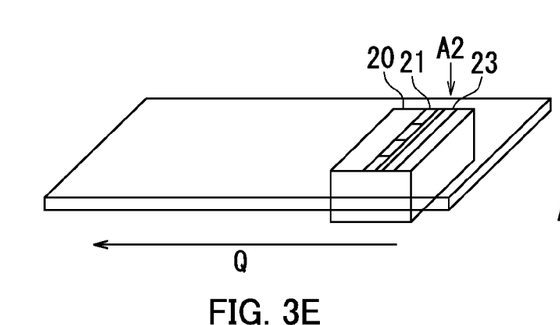
Figure 3F:
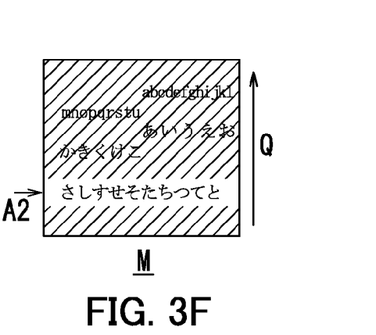

Subsequently, the movable unit 20 moves in the movement direction Q up to a point A2, as shown in FIGS. 3E and 3F. The region in which the point A2 is present includes a read target region where the figures "Sa, Shi, Su, Se, So, Ta, Chi, Tsu, Te, To" in Japanese hiragana characters are present. Accordingly, the controller 30 turns on all of the light emitting elements 22a, the light emitting elements 22b, the light emitting elements 22c, and the light emitting elements 22d. Thus, the read target region including the figures "Sa, Shi, Su, Se, So, Ta, Chi, Tsu, Te, To" in Japanese hiragana characters is read. In so doing, the controller 30 causes the light source 21 to irradiate light to the original document M at a light quantity higher than that in the pre-scan, which has been described with reference to FIGS. 3A and 3B. The light quantity at this time may be referred to as a predetermined light quantity in the present description.

Figure 3G:
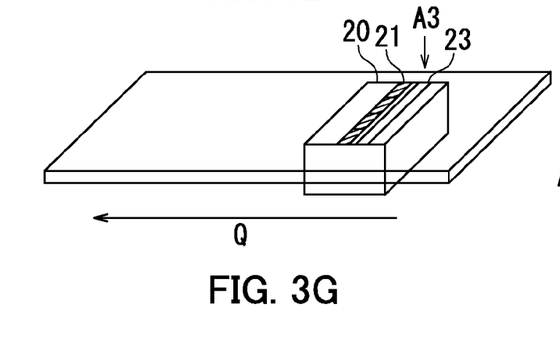
Figure 3H:
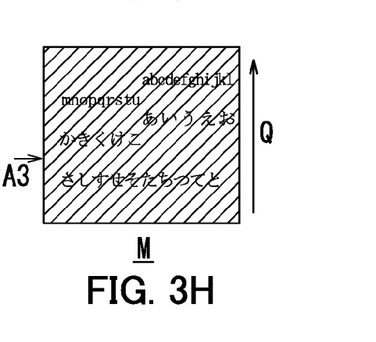

Then, the movable unit 20 moves in the movement direction Q up to a point A3, as shown in FIGS. 3G and 3H. The region in which the point A3 is present includes a non-read target region where no figure is present as space between the line of the figures "Sa, Shi, Su, Se, So, Ta, Chi, Tsu, Te, To" in Japanese hiragana characters and the line of the figures "Ka, Ki, Ku, Ke, Ko" in the Japanese hiragana characters. Accordingly, the controller 30 turns off all of the light emitting elements 22a, the light emitting elements 22b, the light emitting elements 22c, and the light emitting elements 22d.

Description of light emission control on the light source 21 of the image reading device 10 according to the present disclosure will be continued with reference to FIG. 4. FIGS. 4A, 4C, 4E, and 4G are schematic perspective views showing the image reading device 10 according to the present embodiment of the present disclosure. FIGS. 4B, 4D, 4F, and 4H are schematic illustrations corresponding to FIGS. 4A, 4C, 4E, and 4G, respectively, and each showing the position of the movable unit 20 relative to the original document M.

Figure 4A:
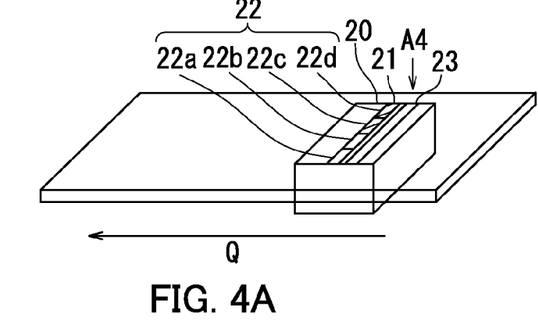
FIGS. 4A, 4C, 4E, and 4G are schematic perspective views showing the image reading device according to one embodiment of the present disclosure.
Figure 4B:
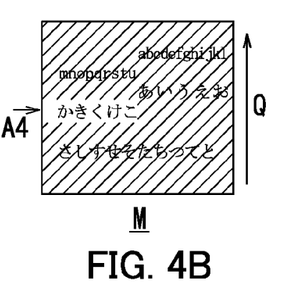
FIGS. 4B, 4D, 4F, and 4H are schematic illustrations corresponding to FIGS. 4A, 4C, 4E, and 4G, respectively, and each showing the position of the movable unit relative to the original document.

Subsequently, the movable unit 20 moves in the movement direction Q up to a point A4, as shown in FIGS. 4A and 4B. The region in which the point A4 is present includes a read target region where the figures "Ka, Ki, Ku, Ke, Ko" in Japanese hiragana characters are present in the left half part and a non-read target region where no figure is present in the right half part. Accordingly, the controller 30 turns on the light emitting elements 22a and the light emitting elements 22b, while turning off the light emitting elements 22c and the light emitting elements 22d.

Figure 4C:
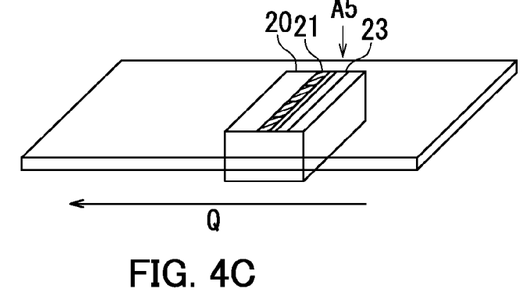
Figure 4D:
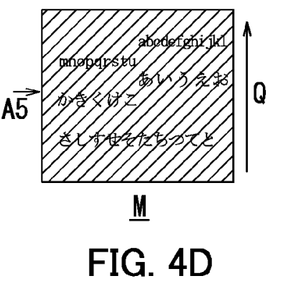

Then, the movable unit 20 moves in the movement direction Q up to a point A5, as shown in FIGS. 4C and 4D. The region in which the point A5 is present includes a non-read target region where no figure is present as space between the line of the figures "Ka, Ki, Ku, Ke, Ko" in Japanese hiragana characters and the line of the figures "A, I, U, E, O" in Japanese hiragana characters. Accordingly, the controller 30 turns off all of the light emitting elements 22a, the light emitting elements 22b, the light emitting elements 22c, and the light emitting elements 22d.

Figure 4E:
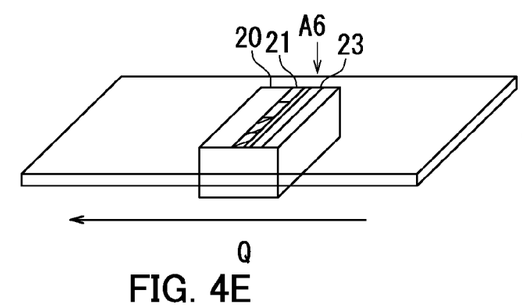
Figure 4F:
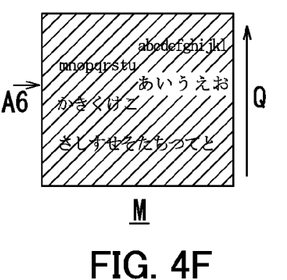

Thereafter, the movable unit 20 moves in the movement direction Q up to a point A6, as shown in FIGS. 4E and 4F. The region in which the point A6 is present includes a read target region where the figures "A, I, U, E, O" in Japanese hiragana characters are present in the right half part and a non-read target region where no figure is present in the left half part. Accordingly, the controller 30 turns off the light emitting elements 22a and the light emitting elements 22b, while turning on the light emitting elements 22c and the light emitting elements 22d.

Figure 4G:
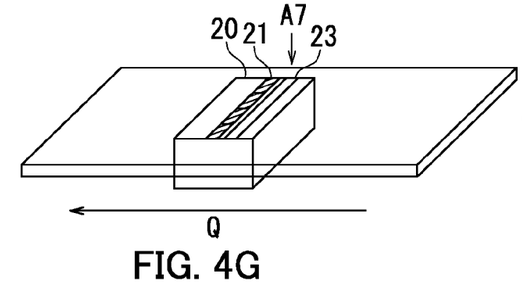
Figure 4H:
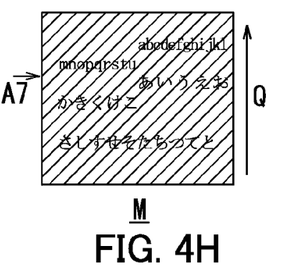

Then, the movable unit 20 moves in the movement direction Q up to a point A7, as shown in FIGS. 4G and 4H. The region in which the point A7 is present includes a non-read target region where no figure is present as space between the line of the figures "A, I, U, E, O" in Japanese hiragana characters and the line of the figures "mnopqrstu" in alphabetic characters. Accordingly, the controller 30 turns off all of the light emitting elements 22a, the light emitting elements 22b, the light emitting elements 22c, and the light emitting elements 22d.

Description of the light emission control on the light source 21 of the image reading device 10 according to the present disclosure will be continued with reference to FIG. 5. FIGS. 5A, 5C, 5E, and 5G are schematic perspective views showing the image reading device 10 according to the present embodiment of the present disclosure. FIGS. 5B, 5D, 5F, and 5H are schematic illustrations corresponding to FIGS. 5A, 5C, 5E, and 5G, respectively, and each showing the position of the movable unit 20 relative to the original document M.

Figure 5A:
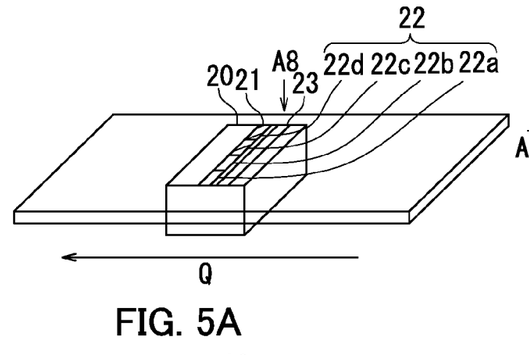
FIGS. 5A, 5C, 5E, and 5G are schematic perspective views showing the image reading device according to one embodiment of the present disclosure.
Figure 5B:
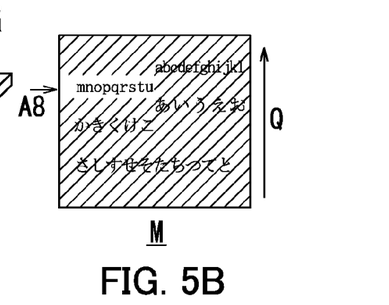
FIGS. 5B, 5D, 5F, and 5H are schematic illustrations corresponding to FIGS. 5A, 5C, 5E, and 5G, respectively, and each showing the position of the movable unit relative to the original document.

Thereafter, the movable unit 20 moves in the movement direction Q up to a point A8, as shown in FIGS. 5A and 5B. The region in which the point A8 is present includes a read target region where the figures "mnopqrstu" in alphabetic characters are present in the left half part and a non-read target region where no figure is present as a background in the right half part. Accordingly, the controller 30 turns on the light emitting elements 22a and the light emitting elements 22b, while turning off the light emitting elements 22c and the light emitting elements 22d.

Figure 5C:
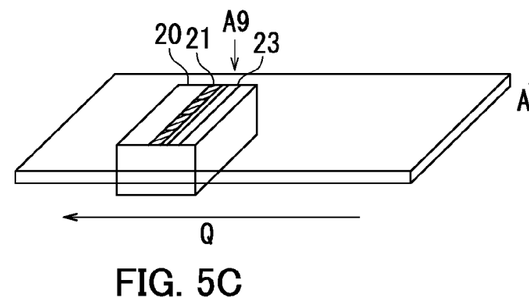
Figure 5D:
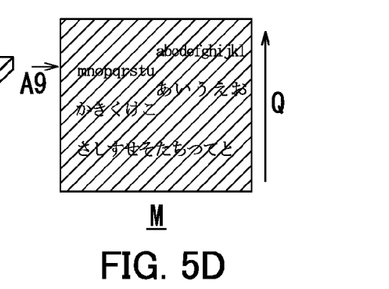

Subsequently, the movable unit 20 moves in the movement direction Q up to a point A9, as shown in FIGS. 5C and 5D. Since the region where the point A9 is present includes a non-read target region where no figure is present as space between the line of the figures "mnopqrstu" in alphabetic characters and the line of the figures "abcdefghijkl" in alphabetic characters, the controller 30 turns off all of the light emitting elements 22a, the light emitting elements 22b, the light emitting elements 22c, and the light emitting elements 22d.

Figure 5E:
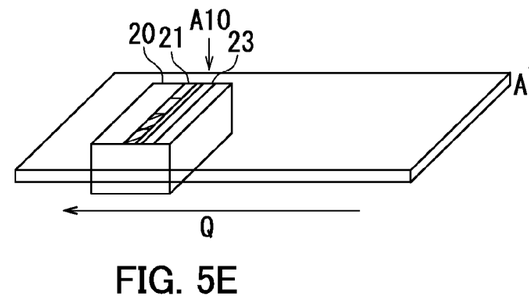
Figure 5F:
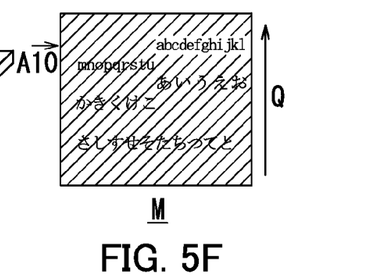

Thereafter, the movable unit 20 moves in the movement direction Q up to a point A10, as shown in FIGS. 5E and 5F. The region in which the point A10 is present includes a read target region where the figures "abcdefghijkl" in alphabetic characters are present in the right half part and a non-read target region where no figure is present as a background in the left half part. Accordingly, the controller 30 turns off the light emitting elements 22a and the light emitting elements 22b, while turning on the light emitting elements 22c and the light emitting elements 22d.

Figure 5G:
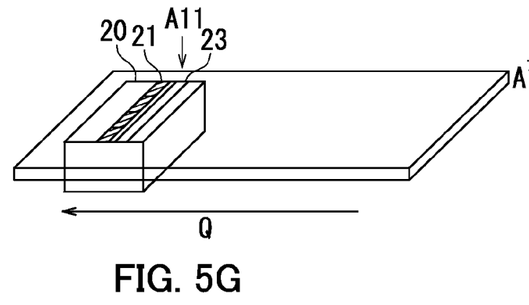
Figure 5H:
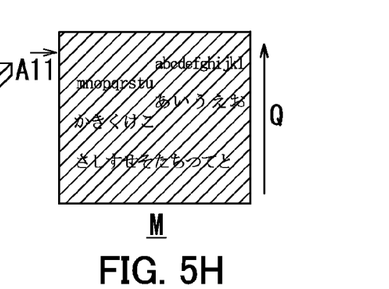

Then, the movable unit 20 moves in the movement direction Q up to a point A11, as shown in FIGS. 5G and 5H. The region in which the point A11 is present includes a non-read target region where no figure is present. Accordingly, the controller 30 turns off all of the light emitting elements 22a, the light emitting elements 22b, the light emitting elements 22c, and the light emitting elements 22d.

It is noted that the original document M includes the characters in the above example described with reference to FIGS. 2-5, but may include a picture, a photograph, etc. In this case, the region where the picture, the photograph, etc. is present is a read target region. Thus, the scan data is obtained.

As described above, in the present embodiment, any light emitting element 22 is turned off in a region where reading is unnecessary so as not to consume unnecessary electric power, thereby achieving effective reduction in power consumption. In particular, reduction in power consumption can be effective in an original document with less printing part.

Further, as has been described with reference to FIGS. 1-5, before the imaging section 26 obtains the scan data, the controller 30 of the image reading device 10 causes the light source 21 to irradiate light to the original document M at a light quantity lower than that in obtaining the scan data, while causing it to move relative to the original document M. The controller 30 controls the light source 21 and the imaging section 26 so that the imaging section 26 performs pre-scan to obtain the pre-scan data read from the original document M by irradiating the light emitted from the light source 21. The controller 30 determines the read target regions and the non-read target regions in the original document M on the basis of the pre-scan data. The light quantity is lower in the pre-scan than that in obtaining the scan data. Accordingly, the pre-scan data for determination of the read target regions and the non-read target regions can be obtained with less power consumption.

Furthermore, as has been described with reference to FIGS. 1-5, the direction in which the light source 21 moves relative to the original document M when the imaging section 26 obtains the scan data is a direction reverse to the direction in which the light source 21 moves relative to the original document M when the imaging section 26 obtains the pre-scan data. In other words, the direction in which the light source 21 moves relative to the original document M when the imaging section 26 obtains the scan data is the direction reverse to that in a conventional scheme and is a direction in which the movable unit 20 returns to the home position. However, the distance between which the movable unit 20 moves is the same as that in the conventional scheme. Therefore, no difference from the conventional scheme exists in power consumption by motor drive application.

It is noted that it is preferable to overwrite data corresponding to each non-read target region as a background in the scan data with background color data identified by the pre-scan data.

Figure 6A:
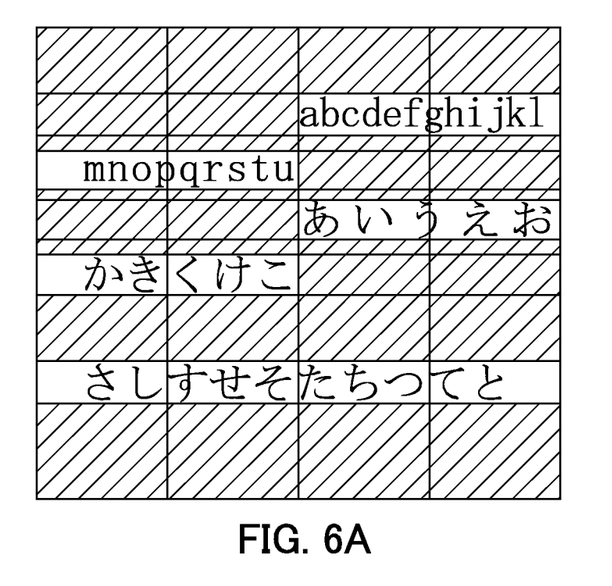
FIG. 6A is a schematic illustration showing scan data read in one embodiment of the present disclosure.
Figure 6B:
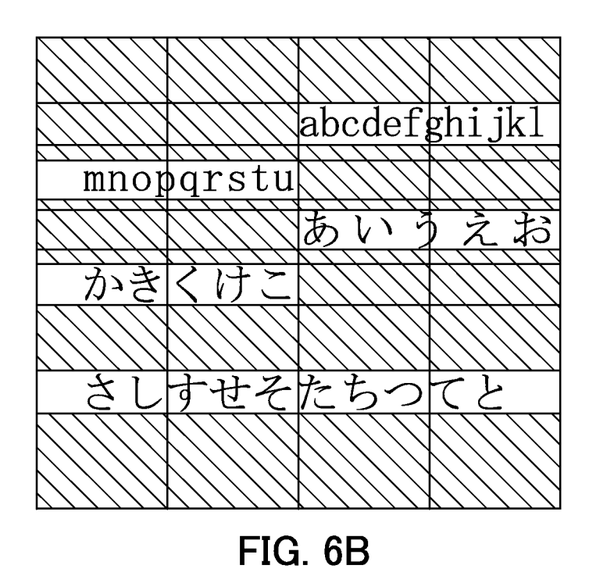
FIG. 6B is a schematic illustration showing scan data which is overwritten with background color data in the embodiment of the present disclosure.

FIG. 6A is a schematic illustration showing the scan data read in the embodiment of the present disclosure. FIG. 6B is a schematic illustration showing scan data overwritten with the background color data in the embodiment of the present disclosure.

Each light emitting element corresponding to the non-read target regions as the backgrounds is turned off in obtaining the scan data by reading the original document M in the image reading device 10. For this reason, data corresponding to the non-read target regions in the scan data, which are hatched in FIG. 6A, does not accurately reflect the inherent color of the corresponding backgrounds in the original document M. Specifically, even if the background color is, for example, white, the data corresponding to the non-read target regions shows comparatively low light intensity. For this reason, data in the scan data which corresponds to the non-read target regions as the backgrounds is preferably overwritten with data of the inherent background color data.

First, the controller 30 identifies pre-background color data corresponding to the non-read target regions in the original document M from the pre-scan data. In the pre-scan, the original document M is read at a light quantity lower than that of the light source 21 in obtaining the scan data. Accordingly, the pre-background color data is different from the data of the inherent background color data on the original document M. Specifically, the light intensity shown in the pre-background color data is lower than that shown in the background color data of the original document M where the entire original document M is read using the light source 21 at the predetermined light quantity.

In view of this, the controller 30 generates background color data on the basis of the pre-background color data. For example, the controller 30 may generate the background color data by calculating the pre-background color data with the light quantity of the light source 21 in the pre-scan taken into consideration. Alternatively, it is possible that the pixel value of the background color data corresponding to the pixel value of the pre-background color data is stored in advance in the storage section, such as ROM, and the controller 30 generates background color data that the controller 30 is to overwrite by referencing the background color data in the storage section.

Upon generation of the background color data, data corresponding to the non-read target regions in the scan data is overwritten with the generated background color data. Referring to FIG. 6B, the data of the hatched non-read target regions obtained in the scan data is overwritten with the generated background color data. The scan data can be generated which corresponds to the data obtained by reading the entire original document M at the predetermined light quantity.

Thus, the controller 30 of the image reading device 10 identifies the pre-background color data corresponding to the non-read target regions in the original document M from the pre-scan data. Then, the controller 30 generates the background color data on the basis of the pre-background color data. Thereafter, the data corresponding to the non-read target regions in the scan data is overwritten with the background color data. Thus, the scan data of the non-read target regions as the backgrounds can be set to the inherent background color of the original document M.

It is noted that the resolution when the imaging section obtains the pre-scan data can be lower than that when the imaging section 26 obtains the scan data. Where the resolution when the imaging section 26 obtains the pre-scan data is set lower, the movement speed of the movable unit 20 can be set high, which may result in reduction in time required for the pre-scan.

Figure 7:
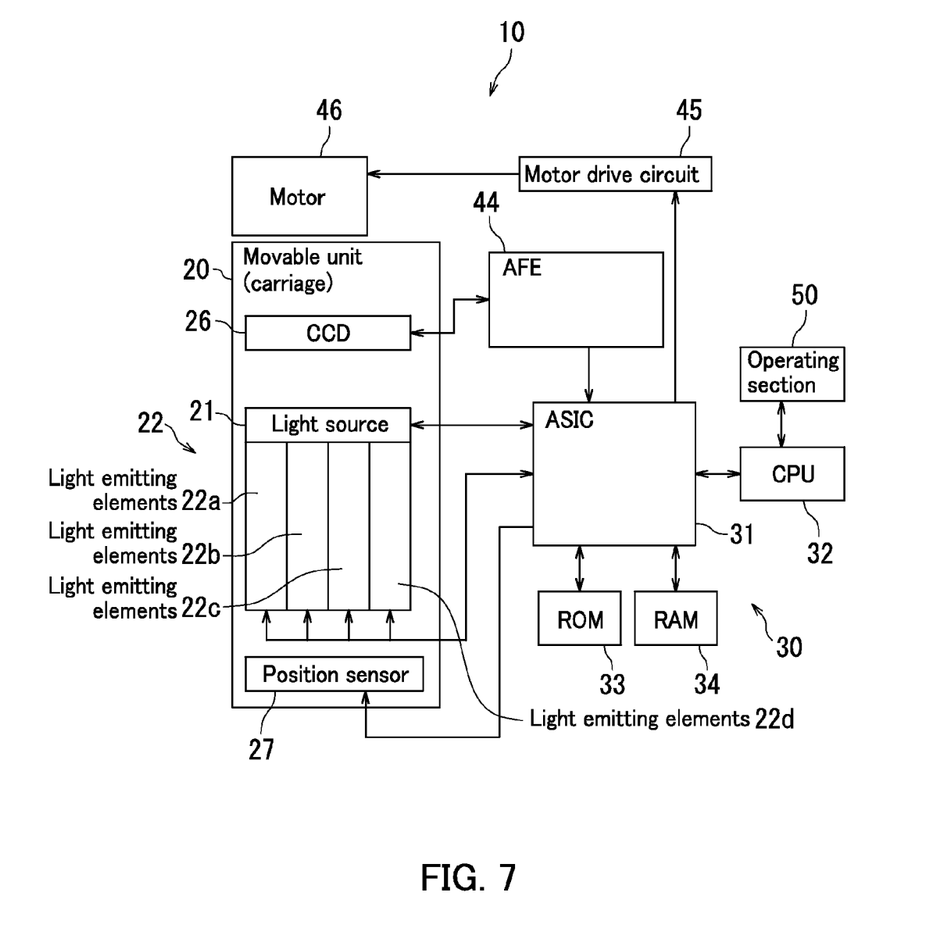
FIG. 7 is a schematic block diagram showing an image reading device 10 according to one embodiment of the present disclosure.

The image reading device 10 according to one embodiment of the present disclosure will now be described with reference to FIG. 7. FIG. 7 is a schematic block diagram showing the image reading device 10 according to the embodiment of the present disclosure.

The image reading device 10 includes a controller 30, an imaging section 26, and a light source 21. The controller 30 includes an ASIC 31, a CPU 32, a ROM 33, and a RAM 34. The imaging section 26, the light source 21, and a position sensor 27 are built in a movable unit (carriage) 20. The light source 21 includes a plurality of light emitting elements 22 (light emitting elements 22a, light emitting elements 22b, light emitting elements 22c, and light emitting elements 22d).

The ASIC 31 performs dimmer control on the light source 21. Specifically, the ASIC 31 adjusts the light quantity in pre-scan to be lower than that in obtaining scan data (predetermined light quantity).

The ASIC 31 controls turning on/off of the plurality of light emitting elements 22 (light emitting elements 22a, light emitting elements 22b, light emitting elements 22c, and light emitting elements 22d). Specifically, in obtaining scan data, the ASIC 31 turns on each light emitting element 22 corresponding to the read target regions out of the plurality of light emitting elements 22. By contrast, the ASIC 31 turns off each light emitting element 22 corresponding to the non-read target regions out of the plurality of light emitting elements 22. The position sensor 27 detects the position of the movable unit 20.

The scan data read by the imaging section (CCD) 26 is output to the AFE 44. The AFE 44 then converts the scan data from its analog signal to a digital signal. Thereafter, the scan data converted to the digital signal is input to the ASIC 31.

The ROM 33 stores background color data, for example. The RAM 34 stores pre-scan data in pre-scan, for example.

The ASIC 31 outputs a motor control signal to a motor drive circuit 45. The motor drive circuit 45 drives a motor 46 on the basis of the motor control signal output from the ASIC 31. The motor 46 is driven to move the movable unit 20.

The image reading device 10 further includes an operating section 50. The operating section 50 will be described later in detail with reference to FIG. 8. Upon receipt of the input from the user, the operating section 50 outputs a signal to the CPU 32. Then, the CPU 32 outputs a signal to the ASIC 31.

The image reading device 10 according to the embodiment of the present disclosure will be described further with reference to FIG. 8. FIG. 8 is a schematic perspective view showing the image reading device 10 according to one embodiment of the present disclosure. The image reading device 10 includes the operating section 50 in addition to the light source 21, the imaging section 26, and the controller 30 (see FIG. 1 and the like).

The operating section 50 includes a touch panel 51 and an operation button 52. The operation button 52 includes a numeric keypad, a start button, etc. The user can input his/her determination as to whether to perform the above described pre-scan through the touch panel 51 or the operation button 52. In one example, the user can use the operation section 50 to set the pre-scan such that the pre-scan is performed when few figures are present in the original document M, that is, when a read target region is less occupied, and is not performed when many figures are present in the original document M, that is, a read target region is much occupied.

The operating section 50 receives selection input as to whether to perform the pre-scan or not in the image reading device 10. Then, the controller 30 determines whether the pre-scan is to be performed or not on the basis of the selection input. This can achieve effective power saving.

Further, the user can determine a read target region or a non-read target region, which have been described before, through the touch panel 51 or the operation button 52. Specifically, where only the upper half part of the original document M is desired to read, the user can specify the upper half part of the original document M as a read target region by manipulating the touch panel 51 or the operation button 52. Alternatively, where part in which a figure is present but should not be read is present in the original document M, the user can specify any desired region in the original document M as a non-read target region by manipulating the touch panel 51 or the operation button 52.

The operating section 50 receives region specification input of at least one of a read target region and a non-read target region in the image reading device 10. The read target region or the non-read target region may be identified by combining a read target region or a non-read target region distinguished in the pre-scan and a read target region or a non-read target region that the user specifies. The controller 30 identifies at least one of a read target region and a non-read target region on the basis of at least one of the read target region and the non-read target region specified by region specification input. Accordingly, the read target region can be set at a high degree of freedom.

Figure 9:
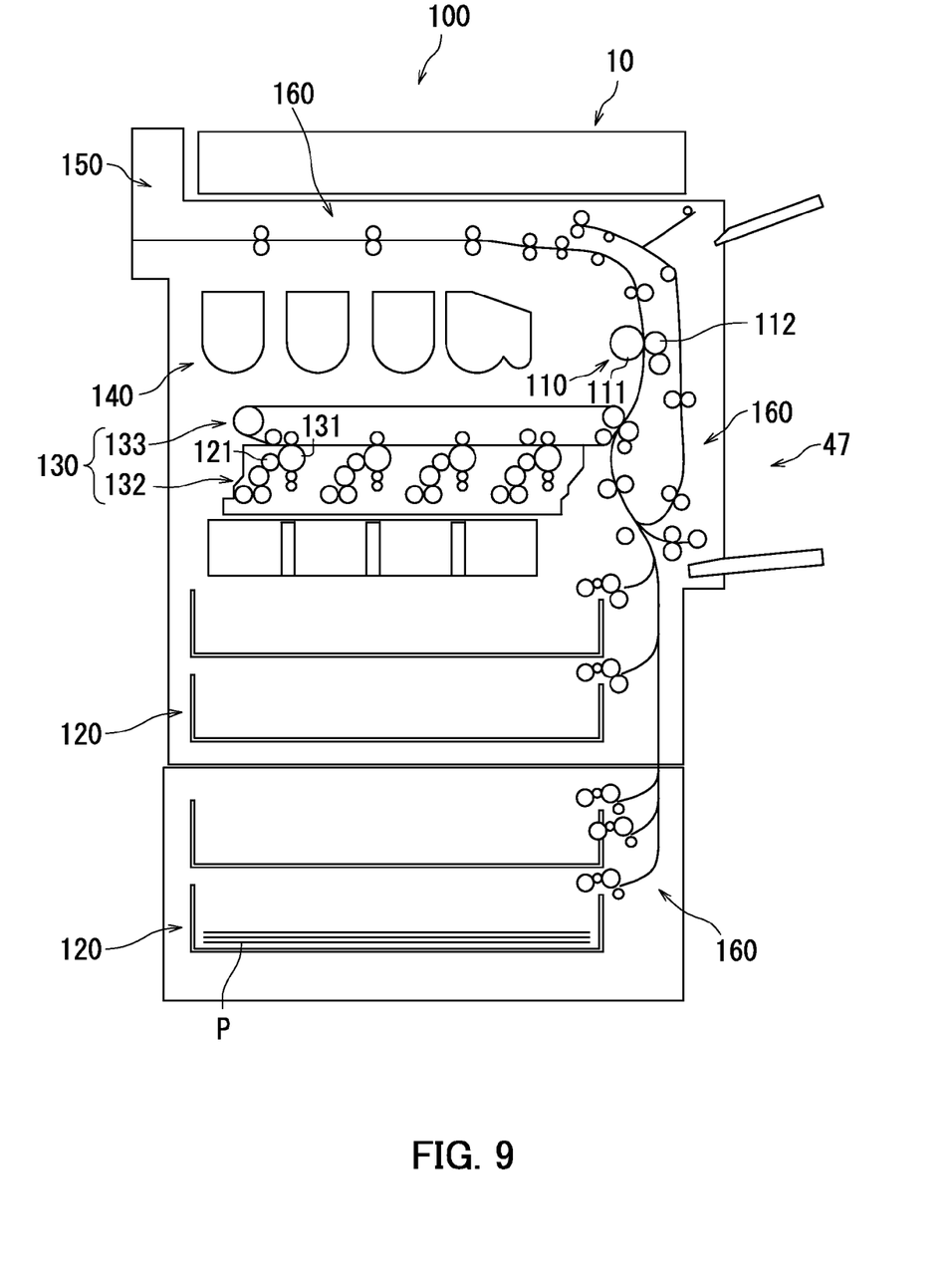
FIG. 9 is a schematic illustration showing an image forming apparatus 100 according to one embodiment of the present disclosure.

FIG. 9 is a schematic illustration showing an image forming apparatus 100 according to one embodiment of the present disclosure. The image forming apparatus 100 may be a copier, a printer, a facsimile machine, or a multifunction peripheral having functions of them. A copier will be described as one example below. However, the present disclosure is not limited to the copier. The image forming apparatus 100 includes the image reading device 10 and a printing section 47. The printing section 47 includes a fixing device 110, a paper feed cassette 120, an image forming section 130, a toner replenishment device 140, a paper ejection section 150, and a paper conveyance section 160. The printing section 47 performs printing on the basis of scan data obtained by the image reading device 10.

Paper P for printing is accommodated in the paper feed cassette 120. In copying, the paper P in the paper feed cassette 120 is conveyed by the paper conveyance section 160 via the image forming section 130 and the fixing device 110 and is then ejected from the paper ejection section 150.

The image forming section 130 forms a toner image on the paper P. The image forming section 130 includes a photoreceptor 131, a development device 132, and a transfer device 133.

An electrostatic latent image is formed on the photoreceptor 131 by a laser based on electronic signals of a document image generated in the image reading device 10. The development device 132 includes a development roller 121. The development roller 121 develops the electrostatic latent image by supplying toner to the photoreceptor 131, thereby forming the toner image on the photoreceptor 131. The toner is replenished from the toner replenishment device 140 to the development device 132.

The transfer device 133 transfers the toner image formed on the photoreceptor 131 to the paper P.

The fixing device 110 applies heat and pressure to the paper P with the use of a fixing member 111 and a pressure member 112 to melt the toner image, which is formed in the image forming section 130 and is not yet fixed, thereby fixing the toner image to the paper P.

What is claimed is:

1. An image reading device, comprising
a light source including a plurality of light emitting elements and configured to irradiate light to an original document, while moving relative to the original document;
an imaging section configured to obtain scan data read from the original document by irradiating the light to the original document from the light source; and
a controller configured to control the light source and the imaging section,
wherein the controller determines a read target region and a non-read target region in the original document, and
the controller causes the imaging section to obtain the scan data on the basis of a determination result, while turning on a light emitting element out of the plurality of light emitting elements, which corresponds to the read target region and turning off a light emitting element out of the plurality of light emitting elements, which corresponds to the non-read target region.

2. An image reading device according to claim 1, wherein before the imaging section obtains the scan data, the controller controls the light source and the imaging section so as to cause the light source to irradiate the light to the original document at a light quantity lower than that in obtaining the scan data and to move relative to the original document simultaneously and so as to cause the imaging section to perform pre-scan to obtain pre-scan data read from the original document by irradiating the light from the light source, and the controller distinguishes the read target region and the non-read target region in the original document on the basis of the pre-scan data.

3. An image reading device according to claim 2, wherein a direction in which the light source moves relative to the original document when the imaging section obtains the scan data is a direction reverse to a direction in which the light source moves relative to the original document when the imaging section obtains the pre-scan data.

4. An image reading device according to claim 2, wherein the controller identifies pre-background color data corresponding to the non-read target region in the original document from the pre-scan data, generates background color data on the basis of the pre-background color data, and overwrites scan data corresponding to the non-read target region in the scan data with the background color data.

5. An image reading device according to claim 4, wherein the controller generates the background color data in a manner to calculate the pre-background color data on the basis of light quantity of the light source in performing pre-scan.

6. An image reading device according to claim 4, wherein the controller includes a storage section configured to store background color data corresponding to the pre-background color data, and the controller generates the background color data by referencing the background color data corresponding to the pre-background color data stored in the storage section.

7. An image reading device according to claim 2, wherein a resolution when the imaging section obtains the pre-scan data is lower than that when the imaging section obtains the scan data.

8. An image reading device according to claim 2, further comprising:
an operating section configured to receive selection input as to whether to perform the pre-scan or not,
wherein the controller determines whether the pre-scan is to be performed or not on the basis of the selection input.

9. An image reading device according to claim 8, wherein the operating section receives region specification input of at least one of the read target region and the non-read target region, and
the controller determines at least one of the read target region and the non-read target region on the basis of the at least one of the read target region and the non-read target region specified by the region specification input.

10. An image reading device according to claim 1, wherein the plurality of light emitting elements are arranged in one direction, and
the light source moves relative to the original document in a direction orthogonal to the one direction in which the plurality of light emitting elements are arranged.

11. An image reading device according to claim 1, wherein each of the plurality of light emitting elements is an LED.

12. An image forming apparatus comprising:
an image reading device according to claim 1; and
a printing section configured to perform printing on the basis of the scan data obtained by the image reading device.

* * * * *